United States Patent
Henning et al.

[11] 3,774,105
[45] Nov. 20, 1973

[54] CONDUCTIVITY CELLS

[75] Inventors: Michael Laurence Henning, Somerset; Leslie Kenneth Godfrey, Stalbridge, both of England

[73] Assignee: Plessey Handel und Investments A. G., Zug, Switzerland

[22] Filed: June 22, 1972

[21] Appl. No.: 265,364

[30] Foreign Application Priority Data
June 29, 1971 Great Britain.................. 30,371/71

[52] U.S. Cl. ............................ 324/30 B, 324/64
[51] Int. Cl. ............................ G01h 27/42
[58] Field of Search ............ 324/30 B, 30 R, 62 R, 324/64

[56] References Cited
UNITED STATES PATENTS
3,601,693  8/1971  Lorentzen........................ 324/30 R
3,432,746  3/1969  Robinson......................... 324/30 R
3,376,501  4/1968  Peranio............................ 324/30 B
2,871,445  1/1959  Carter et al...................... 324/64 X Primary Examiner—Rudolph V. Rolinec
Assistant Examiner—Rolf Hille
Attorney—Samuel Scrivener, Jr. et al.

[57] ABSTRACT

A conductivity measuring cell comprising two tubes arranged concentrically one within the other the outer tube being closed at one end, a first pair of electrodes for connection to a current source one of which is disposed at the bottom of the outer tube and the other of which is disposed near the open end of the outer tube and adapted to extend within the inner tube so as to make contact with any fluid contained therein, and a further pair of electrodes, for connection to a voltage measuring arrangement, disposed within an annular space between the tubes and arranged in spaced apart relationship.

2 Claims, 1 Drawing Figure

PATENTED NOV 20 1973 3,774,105
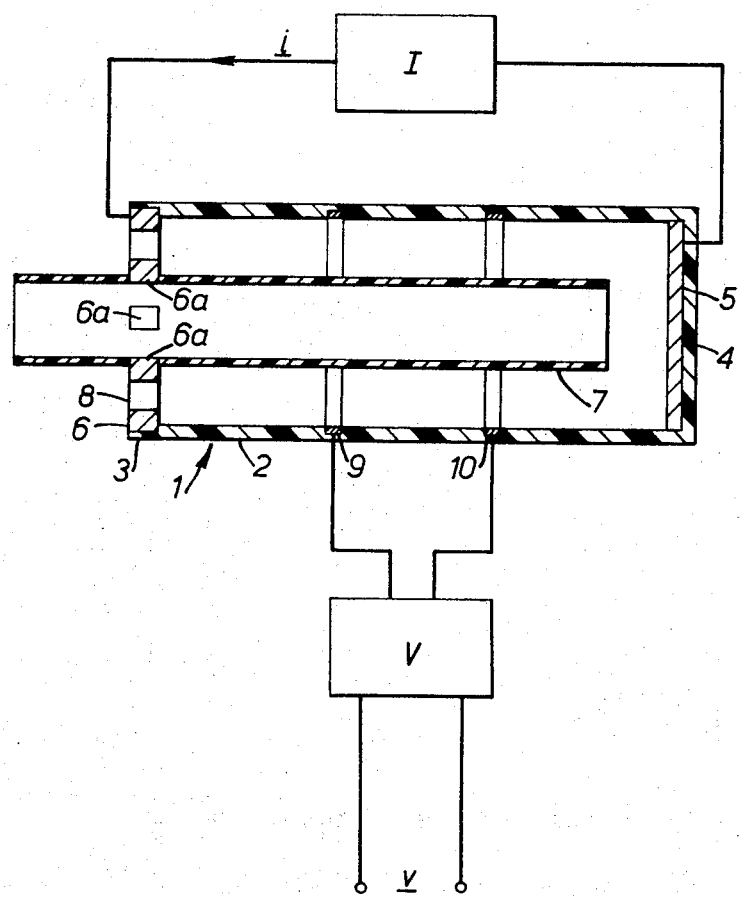

CONDUCTIVITY CELLS

This invention relates to a conductivity cell for use in the measurement of the electrical conductivity of liquids.

In a measurement of the electrical conductivity of liquids difficulties arise in the determination of the conductivity when the measuring cell has to be fully immersed in the liquid, for example in water pollution or oceanographic studies. These difficulties are due to an electrical current flowing in the leakage path outside the confines of the cell. The present invention therefore seeks to provide a conductivity cell that has no external leakage path for current. According to the present invention a conductivity measuring cell comprises an outer tube closed at one end and open at the other end thereof, and an inner tube disposed within the outer tube and open at both ends thereof to permit of fluid flow in a space between the inner and outer tubes to or from the inner tube, a first pair of electrodes for connection to a current source, one electrode of the first pair being disposed adjacent the closed end of the outer tube and the other electrode of the first pair being disposed in the space between the tubes in the region of the open end of the outer tube and extending within the inner tube, and a further pair of electrodes for connection to a voltage measuring device and disposed in spaced apart relationship in the direction of fluid flow in the space between the two tubes.

It will be appreciated that with an arrangement according to the present invention there is only one current flow path between the said first pair of electrodes, there being no external current paths. It will be appreciated that if that one of the said first pair of electrodes which is adjacent the open end of the outer tube does not extend to within the inner tube there could be a possibility that in addition to the current path between the electrode at the closed end of the outer tube and the inside surface of the electrode adjacent the open end of the outer tube there could also be in parallel with this path a current path from the electrode at the closed end of the outer tube through the fluid in the inner tube to the outside surface of the electrode at the open end of the outer tube through earth.

The invention will now be described by way of example with reference to the accompanying single FIGURE drawing which shows a cross sectional view of a four electrode conductivity cell and includes the electrical connections to the cell.

The cell comprises a housing or container 1 of an electrically insulating material, for example a perspex material, which is formed as a hollow cylinder 2 open at one end 3 and enclosed by an end wall at the other end.

Located inside the housing 1 and abutting against the end wall 4 is a disc electrode 5 which is a snug fit in the housing 2. Located at the open end 3 of the housing is a second electrode 6 having a central circular aperture in which is secured a tube 7 of an electrically insulating material, for example a plastics material. The tube 7 is coaxial with the longitudinal axis of the cylindrical housing 1. The tube 7 extends from a position close to the electrode 5 at the closed end of the housing and projects outside the housing beyond the electrode 6, to enable an external connection to be made if necessary to the tube. For instance, in operation the tube may be connected to a pump (not illustrated) to enable liquid to be pumped through the conductivity measuring cell either continuously or intermittently and thereby provide a self-cleaning action for the cell.

The electrode 6 at the open end of the cell extends through the wall of the tube 7, in several positions 6a around the periphery of the tube 7, to enable electrical contact to be made between the electrode 6 and liquid in the tube. In the annular space formed between the outside of the tube 7 and the inside of the housing the electrode 6 is provided with a plurality of outlet openings 8 for the liquid within the housing which enters the conductivity cells through the tube 7. Alternatively the direction of the flow of the liquid through the cell may be reversed with no effect on the measurement of conductivity. In the illustrated conductivity cell two further electrodes 9 and 10 are located in the wall of the cylindrical portion 2 of the cylindrical housing and are in contact with the inside of the cell.

For the operation of the cell in the measurement of the conductivity of liquid a current source I is connected between the electrodes 5 and 6 to establish current flow through the liquid within the cell. A voltage measuring device V connected between the electrodes 9 and 10 measures the potential drop between the electrodes.

The electrical conductivity of the liquid in the cell can be calculated from the potential difference between the electrodes 9 and 10 divided into the current flowing through the cell and if the currrent is kept to a constant value only a measurement of the potential difference is required or alternatively the potential difference may be kept constant and the difference in current required to keep it constant measured. As will be apparent whilst a cell containing the two intermediate electrodes 9 and 10 is described, as this enables a simple measuring technique to be used, the potential difference can be measured between the electrode 5 and 6 or between several intermediate electrodes.

In operation of the cell it is preferred that the current is pulsed to prevent polarisation of the electrodes. However, even if polarisation does take place as there is no need to measure the actual voltage but only the difference in potential between the electrodes 9 and 10, it will over a short period of time have little or no effect on the operation of the cell. It will be appreciated that the cell may be dipped, open end up, into vats or tanks for conductivity measurement purposes although it might most conveniently be used as a termination to a submerged inlet pipe in a tank or vat with liquid being pumped through the inner tube 7 to pass into the vat or tank through outlet opening 8.

As will also readily be appreciated from the foregoing description there will be no current flow externally of the cell between the electrodes of the cell, thereby avoiding the difficulties previously referred to.

By virtue of the simple construction of cell according to the invention maintenance free operation of the cell over long periods of time is facilitated thereby rendering the cell particularly suited to long term study especially in remote locations. The pumping operation renders the cell very useful in polluted liquid applications due to the self cleaning action referred to previously.

What we claim is:

1. A conductivity measuring cell comprising an outer tube closed at one end and open at the other end thereof and an inner tube disposed within the outer tube and open at both ends thereof to permit of fluid flow in a space between the inner and outer tubes to or from the inner tube, a first pair of electrodes for connection to a current source, one electrode of the first pair being disposed adjacent the closed end of the outer tube and the other electrode of the first pair being disposed in the space between the tubes in the region of the open end of the outer tube and extending within the inner tube, and a further pair of electrodes for connection to a voltage measuring device and disposed in spaced apart relationship in the direction of fluid flow in the space between the two tubes.

2. A conductivity measuring cell as claimed in claim 1, wherein the inner tube is disposed concentrically within the outer tube and wherein the said one electrode of the first pair of electrodes and both electrodes of the said further pair of electrodes are of generally annular configuration and disposed within the space between the tubes.

* * * * *